July 12, 1955
C. W. DEMPSTER
2,712,739
UNIVERSAL JOINT
Filed May 19, 1953
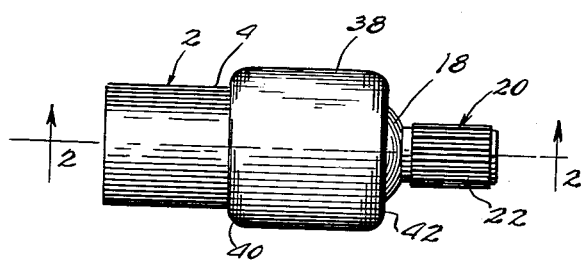
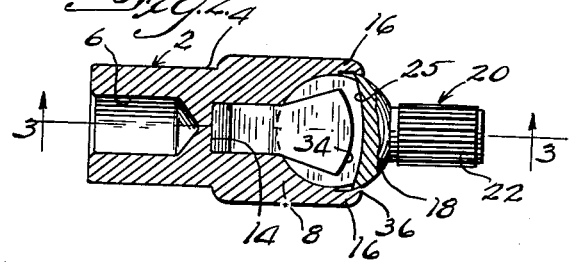
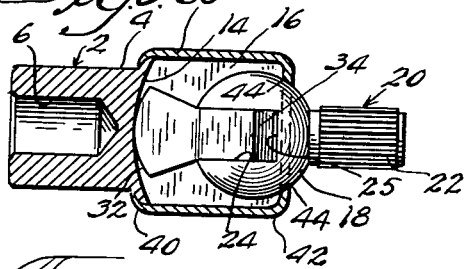
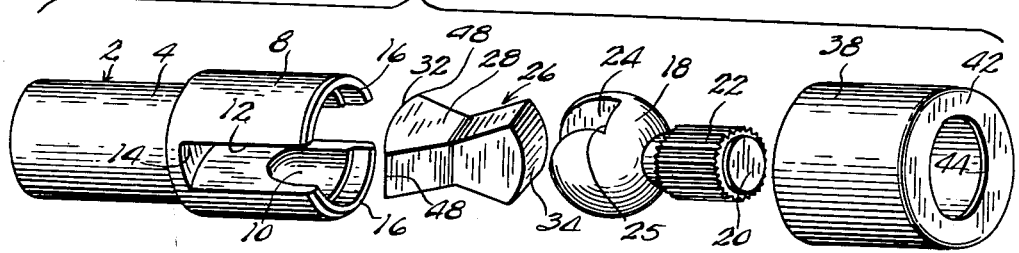
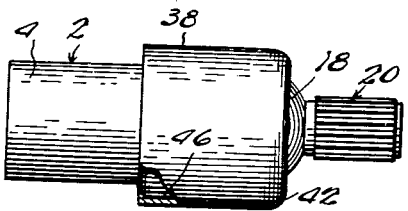
INVENTOR.
Charles W. Dempster
BY.
B. Gordon Allen
Atty.

United States Patent Office 2,712,739
Patented July 12, 1955

2,712,739

UNIVERSAL JOINT

Charles W. Dempster, Chicago, Ill.

Application May 19, 1953, Serial No. 356,061

1 Claim. (Cl. 64—7)

This invention relates to universal joints and more particularly to an economical, compact and durable joint such as is used in transmitting torque from a driving member to a driven member.

A primary object of the invention is to devise a universal joint of the ball and socket type which is simple in form, economical to manufacture and capable of long life in service.

Another object of the invention is to devise novel means for interlocking the ball and socket against relative rotational movement on the longitudinal axes of shanks connected, respectively, to said ball and socket, said means accommodating any relative angular movement between the shanks as may occur in service.

A further object of the invention is to devise a simple and effective means of retaining the ball in its socket, without the necessity of a separate sleeve for this purpose, as heretofore used in the art.

A more specific object of the invention is to provide slots in the ball and socket, which slots receive perpendicularly related tongues of a torque transmitting block, the tongues being formed and arranged to accommodate relative movement of the ball and socket as is necessary to accommodate angularity between the shanks connected thereto.

A different object of the invention is to devise a dust guard sleeve having a portion press-fitted on or bent over behind a head which contains the socket, the opposite end of said sleeve having a radially inwardly projecting flange beveled on its radially inner edge to accommodate movement of the ball without binding, and to substantially eliminate entrance of dust and dirt into the socket.

In my novel arrangement, the dust guard sleeve does not function to hold the ball in the socket, thereby eliminating the possibility of accidental disassembly of the device in the event that the sleeve becomes dislodged in service, and also avoiding any binding between the sleeve flange and the ball, as might interfere with smooth functioning of the device or result in damage thereto.

The foregoing and other objects and advantages of the invention will become apparent from a consideration of the following specification and the accompanying drawings, wherein:

Figure 1 is a side elevational view of a universal joint embodying the invention;

Fig. 2 is a view partly in section along a plane indicated by line 2—2 of Fig. 1, with the dust guard sleeve removed;

Fig. 3 is a view partly in section along a plane perpendicular to that of the section of Fig. 2, as indicated by line 3—3 of Fig. 2;

Fig. 4 is an exploded isometric view; and

Fig. 5 is a partly broken side elevational view similar to Fig. 1, but showing a modification.

Describing the invention in detail, the novel universal joint comprises a body 2 which may be attached by any conventional means (not shown) to an associated driven or driving part. The body 2 comprises a smaller-diameter cylindrical portion or shank 4 having a central opening 6, and said body comprises a larger-diameter portion or head 8 which is provided with a parti-spherical surface or socket 10 facing away from the shank 4.

The head 8 is provided with a slot or groove 12 the bottom or inner end of which is defined by a parti-cylindrical surface or segment 14 on the end of the shank 4 which is attached to the head 8.

The slot 12 bisects the surface 10 so that in effect two parti-spherical surfaces 10 are provided, one on each leg 16 of the head 8 at one side of the slot 12.

Seated against the surface 10 is the ball or spherical end 18 of a driving or driven member 20 having a splined shank 22 for convenient attachment to an associated part. The ball end 18 is slotted or grooved as at 24 for a connection to torque transmitting thrust block 26, and the bottom or inner end of the slot 24 is defined by a parti-cylindrical surface 25.

The block 26 comprises perpendicularly related flat segments or tongues 28 and 30 which may be identical in form, for the purpose of economy in manufacture and ease of assembly. The segment or tongue 28 is snugly received within the slot 12 of the head 8 defined by the legs 16 thereof, and the segment or tongue 30 is snugly received within the slot 24 of the ball end 18 so that the shanks 4 and 22 are positively interlocked against relative rotational movement on the longitudinal axes of said shanks.

Thus, such rotational movement imparted to either shank 4 or 22 is transmitted to the other shank by means of the block 26 regardless of the relative angularity of the shanks 4 and 22.

To accommodate such angular movement between the shanks 4 and 22, the remote ends of the block tongues 28 and 30 are arcuately formed, preferably as segments of cylinders as at 32 and 34, respectively, complementary to the configuration of surfaces 14 and 25. This novel and compact arrangement permits any angular movement between the shanks 4 and 22 while positively interlocking them against relative rotational movement on their longitudinal axes.

Preferably the legs 16 of the head 8 are bent or swaged over to form lips as at 36 (Fig. 2), positively retaining the ball end 18 within the socket 10. In prior art arrangements, this retaining function was accomplished by a separate sleeve which did not afford the positive, dependable retention of the ball end in the socket as is afforded by the novel swaging of the head at 36.

A dust protector sleeve or shroud 38 is sleeved over the head 8 and is anchored to the end thereof which joins the shank 4 by swaging or bending of the sleeve 38 at one end thereof to form a flange as at 40 (Figs. 1 and 3). This arrangement affords a novel and positive interlock between the sleeve 38 and head 8.

The opposite end of the sleeve 38 is provided with a radially inturned flange 42 which overlaps the ball end 18 and is normally spaced very slightly therefrom to prevent dust from entering the socket.

The radially inner edge of the flange 42 is beveled as at 44 (Fig. 3) to avoid binding of the ball end 18 during movement thereof relative to the head 8 as relative angular movement occurs between the shanks 4 and 22.

Fig. 5 shows a slight modification wherein parts corresponding to those of Figs. 1–4 are identified by corresponding numerals. It will be noted that in this modification, the swaged flange 40 is eliminated and the dust guard sleeve is held on the head 8 as by a press or interference fit at 46.

In either embodiment, the tongue 28, which moves within the slot 12 of the head 8 to accommodate certain relative angular movement of the shanks, may be beveled at opposite edges thereof at the corners indicated at 48 in Fig. 4, to prevent interference with the dust guard sleeve 38 during such movement.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

I claim:

A universal joint comprising a member with a shank, a larger-diameter head fixed on said shank comprising spaced legs defining a slot through the head, a parti-spherical socket in said head defined by parti-spherical surfaces on said legs, another member having a parti-spherical ball end complementary to said socket and seated therein, a slot through said ball end facing said shank and approximately perpendicular to the first-mentioned slot, a torque transmitting block having integrally interconnected tongues slidably received in respective slots, the remote edges of said tongues being arcuate and the bottom of each slot being defined by an arcuate surface complementary to that of the related tongue edge and the ends of said lengths remote from said shank being bent toward each other to form lips to positively retain said ball in said socket.

References Cited in the file of this patent

UNITED STATES PATENTS

| | | |
|---|---|---|
| 562,206 | Temple | June 16, 1896 |
| 2,471,665 | Williams | May 31, 1949 |